United States Patent Office 2,764,331
Patented Sept. 25, 1956

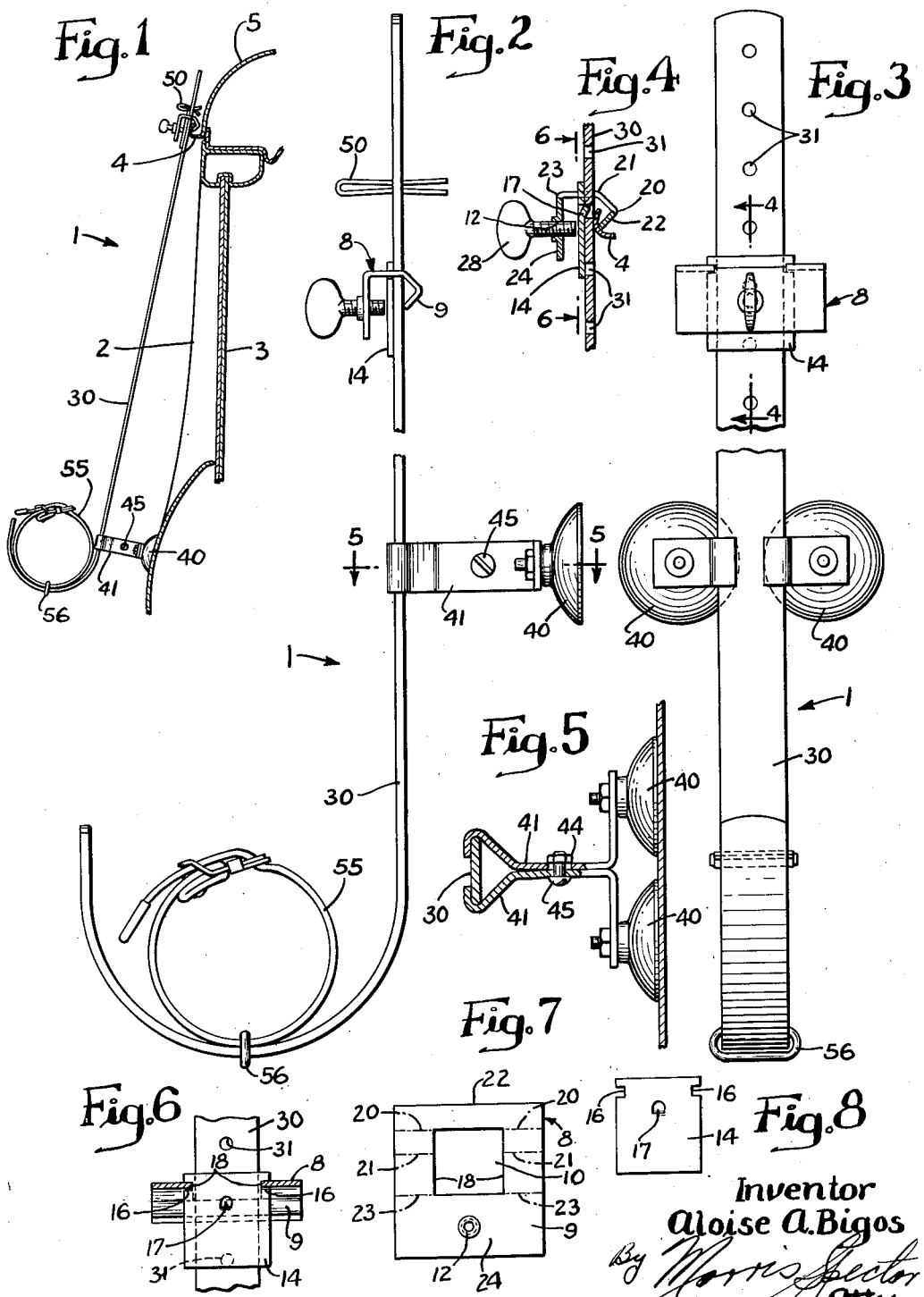

2,764,331

CARRIER FOR ATTACHMENT TO AUTOMOBILES

Aloise A. Bigos, Chicago, Ill.

Application March 9, 1953, Serial No. 341,270

6 Claims. (Cl. 224—42.45)

This invention relates to carriers for attachment to the outside of automobiles for carrying a special type of equipment such as, for instance, fishing poles or the like.

It is one of the objects of the present invention to provide a carrier which may be suspended from the outside of an automobile, from the drip mold thereof, for carrying long objects, such as fishing poles, and which carrier may be easily and quickly attached to or detached from conventional automobiles that may be of greatly different sizes. It it a further object of the present invention to provide such a carrier which will be firmly held in place without danger of becoming loosened by vibrations to which it is subjected when the automobile is in motion. It is a still further object of the present invention to produce a device of the above mentioned character wherein the likelihood of marring the finish on the automobile is reduced to a minimum. It is a still further object of the present invention to produce a device of the above-mentioned character which is economical of construction and simple and reliable in its operation.

The attainment of the above and further objects of the present invention will be apparent from the following specification taken in conjunction with the accompanying drawing forming a part thereof.

In the drawing:

Figure 1 is a fragmentary side view of the device of the present invention shown attached to an automobile;

Figure 2 is an enlarged side view of the device of the present invention;

Figure 3 is a front view thereof;

Figure 4 is a fragmentary sectional view taken along the line 4—4 of Figure 3;

Figure 5 is a sectional view taken along the line 5—5 of Figure 2;

Figure 6 is a view taken along the line 6—6 of Figure 4; and

Figures 7 and 8 are plan views of blanks of parts of the present device.

Reference may now be had more particularly to the drawing wherein like reference numerals designate like parts throughout.

In Figure 1 a carrier 1 constructed in accordance with the present invention is shown together with a portion of an automobile on which the carrier is mounted. The portion of the automobile shown includes a door 2 having the usual window 3, there being a conventional drip mold 4 above the door for catching the drip from the top 5 of the automobile.

The carrier 1 includes a hook member 8 which is formed of a single plate 9 of, for instance, steel, originally of the shape illustrated in Figure 7, which plate has a rectangular hole 10 therein and a screw threaded hole 12 therethrough. A clamping plate 14 is provided for a purpose to be more fully described as this description proceeds. This clamping plate is of a width greater than the width of the hole 10 and less than the length of the diagonal across said hole 10. The clamping plate 14 has notches 16—16 at the opposite ends thereof and has an upwardly facing, rearwardly projecting lug 17 stamped therefrom. The clamping plate 14 is positioned vertically in the hole 10, extending diagonally of said hole, until the notches 16—16 are opposite the sides 18—18 of the plate 9. Thereafter the clamping plate is turned so that it extends at right angles to the sides 18—18 of the plate 9, with the sides 18—18 extending into the notches 16—16. Thereafter the plate 9 is bent to the shape illustrated in Figure 4 by a line of bend indicated at 20—20 and another line of bend indicated at 21—21. The clamping plate 14 is now irremovable from the hole 10 in the plate 9. This also forms a hooked lip 22 for resting in the drip mold. Before, or after, this is done the plate 9 is bent along a line indicated at 23—23 to form a front clamp projecting portion 24 at right angles to the top of the thus formed hook member. A locking screw or wing screw 28 is threaded through the hole 12.

A J-shaped metal carrier strap 30 is slid through the opening in the hook member, between the hooked lip 22 and the clamping plate 14. The carrier strap has a series of holes 31—31 therethrough for cooperating with the lug 17 of the clamping plate 14.

A pair of vacuum suction cups 40—40 are mounted in separate brackets 41—41 that embrace the carrier strap 30 and are slidable thereon and are locked together by a nut 44 that threads on a screw 45 that passes through aligned holes in the brackets 41—41. One or both of the holes are oversized for the shank of the screw to permit relative lengthwise adjustment of the brackets 41—41. This is necessary since the cups 40—40 may have to be out of alignment with one another or at an angle to one another as determined by the contour of the automobile door or body to which the cups are to be attached.

The hook lip 22 is hooked on the drip mold 4 and the strap 30 is adjusted vertically to the proper height, always bringing one of the holes 31 opposite the projecting lug 17 of the clamping plate 14. Thereafter the wing screw 28 is tightened to force the clamping plate against the strap 30 and at the same time to secure the hook member onto the drip mold, the drip member extending between the portion 22 of the hook member and the strap 30. It is to be noted that even if the wing screw 28 becomes slightly loosened, the clamping plate 14, by reason of the projecting lug 17, will prevent the strap 30 from dropping. A cotter pin 50 may be extended through a hole of the drip mold for further assurance against dropping of the carrier strap 30.

The brackets 41—41 are adjusted along the strap 30 to their proper position and then the vacuum cups, after being moistened, are pressed against the adjacent body of the automobile. The screw 45 is then tightened. This now holds the carrier in place. A flexible strap 55 is held in place on the carrier by one or more wire bands 56 and is provided for strapping a load of fishing rods in place.

It is, of course, understood that when the carrier is in use the adjacent doors of an automobile cannot be opened, so that access to the automobile is from the opposite side thereof.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A carrier for attachment to the drip mold of an automobile comprising a hooked member adapted to be suspended from the drip mold, a vertically extending carrier strap slidably adjustable on the hooked member, means for clamping the strap against sliding movement and for clamping the hooked member in said drip mold, resilient suction cup means adapted to engage a portion of an automobile below the drip mold, and a connecting member slidable lengthwise on and carried by the carrier strap and connecting the strap to said suction cup means to permit relative movement between the suction cup and the carrier strap and hooked member.

2. A carrier for attachment to the drip mold of an automobile comprising a hooked member adapted to be suspended from the drip mold, a vertically extending carrier strap slidable through a hole in the hooked member, and a single means for clamping the strap against sliding movement relative to the hooked member and for clamping the hooked member in said drip mold.

3. In a carrier for attachment to a ledge of an automobile body comprising a hooked member adapted to be suspended from the ledge and straddle the same and having an outwardly projecting portion adapted to project below the ledge and on the outside thereof, a vertically extending carrier strap slidable through a hole in the hook member between the ledge and said projecting portion, means including a locking screw threaded through said projecting portion and forcing the carrier strap toward the ledge and clamping the hooked member to said ledge, and a locking clamp plate secured to the hooked member between the screw and the strap for forcing the strap toward the ledge under the action of the screw.

4. In a carrier for attachment to a ledge of an automobile body, a hooked member adapted to be suspended from the ledge and straddle the same and having a rear ledge-engaging portion, an intermediate portion adapted to extend outwardly from the ledge and a depending portion at the front of said intermediate portion, said intermediate portion having a hole therethrough, a depending carrier member passing through said hole, a locking clamp plate in front of said carrier member and secured to said hook member for movement toward and away from the ledge, and means including a locking screw threaded through said depending portion for forcing the clamping plate against said carrier member and to clamp the carrier member against said ledge.

5. In a carrier for attachment to a ledge of an automobile body, a hooked member adapted to be suspended from the ledge and straddle the same and having a rear ledge-engaging portion, an intermediate portion adapted to extend outwardly from the ledge and a depending portion at the front of said intermediate portion, said intermediate portion having a hole, a depending carrier member slidable through said hole, a locking clamp plate adjacent to the carrier member, said carrier member having a number of vertically spaced openings, a locking lug extending from said clamping plate and adapted to enter one of said carrier member openings, and means including a locking screw threaded through said depending portion of said hooked member for forcing the carrier member and the clamping plate together and toward the ledge for clamping the carrier member and hooked member to said ledge.

6. A carrier for attachment to a ledge of an automobile body, said carrier comprising a hooked member adapted to be suspended from the ledge and straddle the same and having a rear ledge-engaging portion, an intermediate portion adapted to extend outwardly from the ledge and a depending portion at the front of said intermediate portion, said intermediate portion having a hole, a depending carrier strap of rigid material extending through said hole, said carrier strap having a number of longitudinally spaced openings and having at its bottom end an outwardly and upwardly bent portion forming a support saddle, a flexible strap secured to said outwardly and upwardly bent portion of said carrier strap for anchoring objects to be carried by said strap, a locking clamp plate between said carrier strap and depending portion of said hooked member, a locking lug extending from said clamping plate and adapted to enter one of said carrier strap openings, means including a locking screw threaded through said depending portion of said hooked member for forcing the clamping plate toward said carrier strap to clamp the same against the automobile, and means for securing a portion of said carrier strap below said hooked member to the side of the automobile body comprising suction cup means slidable along said carrier strap.

References Cited in the file of this patent

UNITED STATES PATENTS

| | | |
|---|---|---|
| 2,302,300 | Davies | Nov. 17, 1942 |
| 2,514,266 | Walslager | July 4, 1950 |
| 2,558,911 | Penn | July 3, 1951 |
| 2,578,067 | Jensen | Dec. 11, 1951 |
| 2,671,583 | Shaw | Mar. 9, 1954 |